May 10, 1932.    W. L. INGRAM    1,857,382
TIRE VALVE
Filed March 16, 1929
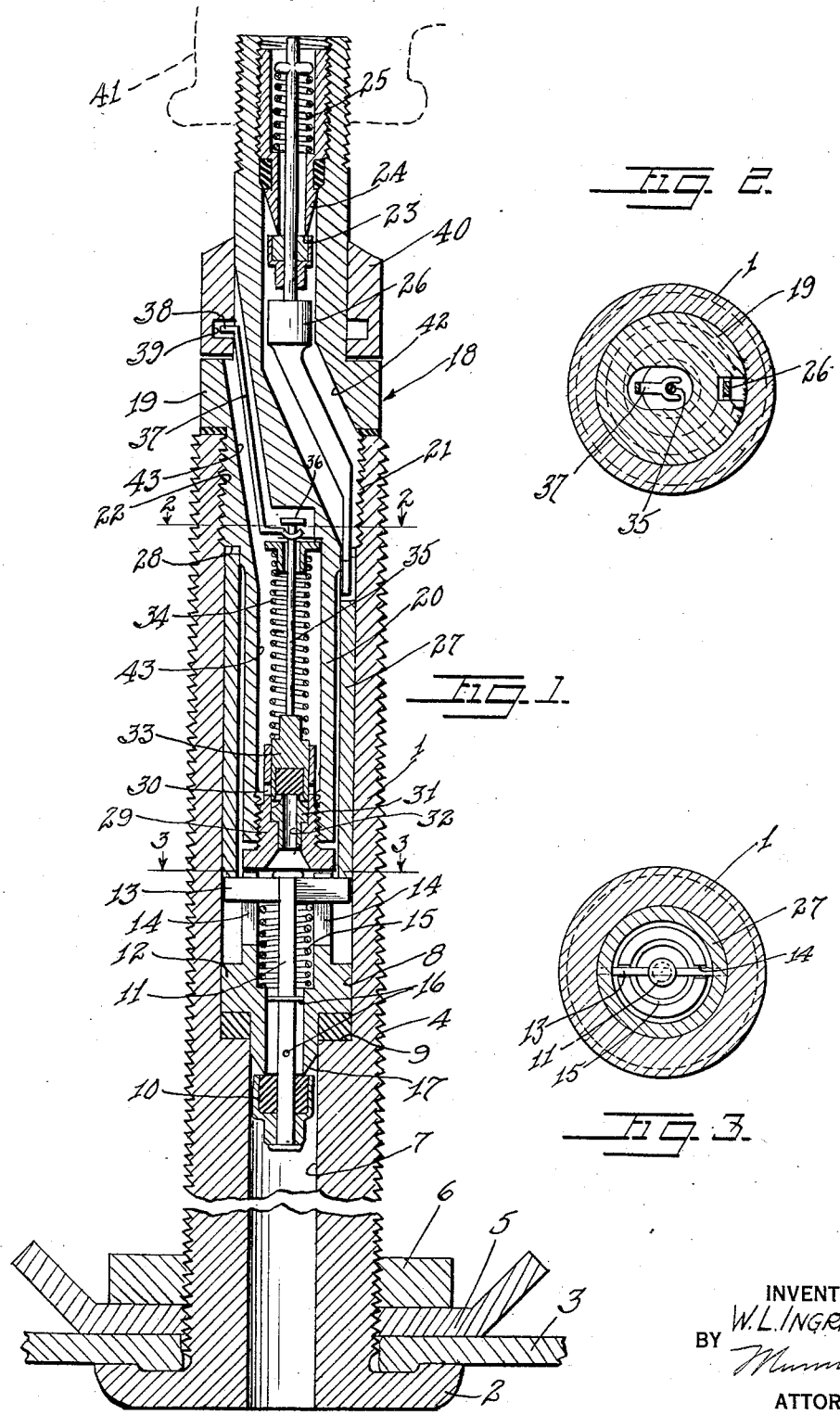
INVENTOR
W. L. INGRAM
BY
ATTORNEYS Patented May 10, 1932

1,857,382

UNITED STATES PATENT OFFICE

WALTER L. INGRAM, OF CHICAGO, ILLINOIS, ASSIGNOR OF ONE-HALF TO FRANKLIN W. INGRAM, OF CHICAGO, ILLINOIS

TIRE VALVE

Application filed March 16, 1929. Serial No. 347,676.

My invention relates to improvements in tire valves, and it consists in the combinations, constructions, and arrangements herein described and claimed.

An object of my invention is to provide a tire valve which has embodied therein a novel means for allowing only a predetermined amount of air to enter the tire.

A further object of my invention is to provide a device of the type described in which the actuating valve may be removed without allowing the air to escape from the tire.

A further object of my invention is to provide a device of the type described which may be the size of the ordinary tire valve and produce the same function in addition to the novel features stated above.

A further object of my invention is to provide a device of the type described which has novel means whereby the relief valve may be raised from its seat manually so that it may be freely moved when the desired amount of air has passed into the tire.

A further object of my invention is to provide a device of the type described which is simple in construction, compact in form, and efficient for the purpose intended.

Other objects and advantages will appear in the following specification, and the novel features of the invention will be particularly pointed out in the appended claim.

My invention is illustrated in the accompanying drawings forming part of this application, in which Figure 1 is an enlarged vertical sectional view of the valve, Figure 2 is a section along the line 2—2 of Figure 1, and Figure 3 is a section along the line 3—3 of Figure 1.

In carrying out my invention I provide a valve casing 1 which has an annular flange 2 arranged to be disposed in a tube 3. The outer surface of the valve casing 1 is provided with threads 4. An ordinary elongated washer 5 is disposed upon the outer surface of the tube 3, concentric with the valve casing 1, and permanently held in place by means of a nut 6.

The casing 1 is provided with a relatively small inner passageway 7 and a relatively large compartment 8 which form a shoulder 9 at their points of meeting. A main valve 10 is provided with a valve stem 11 which extends through a body portion 12 and has, at its free end, a laterally extending guide member 13. The guide member 13 is receivable in elongated slots 14 in the body portion 12 and is normally held in the outermost position by means of a compression spring 15. Guide pins 16 extend through the valve stem 11 at right angles with respect to each other for the purpose of holding the valve 10 in alignment with the valve seat 17.

A unit 18 consists of a housing 19, which has a reduced portion 20 which is arranged to be disposed in the valve casing 1, and a threaded portion 21 which is arranged to be received in the internally threaded end 22 of the casing. A check valve 23 is disposed in the outer end of the housing 19 and is normally held in closed position in engagement with a valve seat 24 by means of a spring 25. An actuating rod 26 is disposed in the housing having one end disposed adjacent the valve 23 and the other end operatively connected to a sleeve 27 which is disposed concentric with the reduced portion 20 of the housing 19. The upper end of the sleeve 27 is receivable in a recess 28 and when the sleeve is in this position the adjacent portion thereof is disposed in close engagement with the housing for a purpose hereinafter described. The lower end of the sleeve is disposed in engagement with the laterally extending guide member 13.

A cylinder 29 is removably disposed in the inner end of the housing 19 and is provided with outlet openings 30. A valve seat 31 having a central passageway 32 therethrough is disposed in the cylinder 29. A piston or relief valve 33 is movably disposed in the cylinder 29 and is arranged to be normally held in engagement with the valve seat 31 by means of a spring 34. The valve 33 is provided with a valve stem 35 which has a head portion 36. A lifting rod 37 has one end disposed beneath the head portion 36 and extends around the valve stem 35. The other end of the lifting rod is bent inwardly as at 38 and is receivable in a recess 39 in a collar 40. The collar 40 is movably disposed upon the housing 19.

From the foregoing description of the various parts of the device, the operation thereof may be readily understood. To fill the tire with air the usual air hose, indicated at 41, is disposed upon the outer end of the housing 19. When the air hose 41 is applied the valve 23 is moved inwardly away from its seat 24. This movement of the valve 23 will impart movement to the actuating rod 26 thus moving the rod inwardly and imparting a similar movement to the sleeve 27. Movement of the sleeve 27 will impart movement to the valve 10 through the guide member 13 thus moving the valve 10 away from its seat. This movement of the various members, caused by the application of the air hose, provides a passageway into the tire. The air will pass into the housing around the valve 23, through the passageway 42, between the sleeve 27 and the reduced portion 20 after the sleeve has been moved out of the recess 28, through the slots 14, through the body portion 12, around the valve 10, through the passageway 7, and into the tire.

The spring 34 is of a sufficient tension so as to overcome only a certain pressure. This pressure may be varied by varying the tension of the spring 34.

As the air passes into the tire the pressure will build up and when the desired pressure has been reached the relief valve 33 will be moved against the tension of the spring 34 allowing the excess air to pass through the openings 30 and through the passageway 43 and into the atmosphere. The first actuation of the valve 33, so as to allow the air under pressure to pass through the openings 30, causes a warning sound to be created so as to indicate to the operator that a sufficient amount of air has been disposed in the tire.

The purpose of the collar 40 and its connection with the valve stem 35 is to provide a means whereby the valve 33 may be manually moved away from its seat 31 before the air hose 41 is applied. Valves of this kind ofttimes stick to their seat thus requiring an additional pressure to release the valve. To avoid this and to enable satisfactory disposal of air, the valve 33 may be moved away from its seat before the air hose is applied. The valve of course is released and allowed to again seat.

By viewing Figure 1 of the drawings it will be noted that a washer is disposed between the body portion 12 and the shoulder 9 for the purpose of providing a sealing means. Furthermore, it will be noted that the cylinder 29, which is disposed in the housing 19, holds the body portion 12 in place.

I claim:

An inflating valve comprising a tubular casing, said casing being provided with a removable extension having a pair of passageways therein, one of the passageways in the extension being arranged for communicating with the interior of the casing, a valve disposed within said casing, means including a sleeve disposed within the casing and the passageway communicating with the interior of the casing for opening the valve when an air hose is applied to the casing, a relief valve disposed within said sleeve and provided with an auxiliary stem extending through the other of said passageways, and operating means slidably disposed upon said extension and connected with the auxiliary stem of said relief valve.

Signed at Chicago, in the county of Cook, and State of Illinois, this 12th day of March, A. D. 1929.

WALTER L. INGRAM.